United States Patent [19]

Hirose

[11] 4,388,875
[45] Jun. 21, 1983

[54] EVAPORATING CONCENTRATOR FOR SEWAGE SLUDGE

[76] Inventor: Yasuo Hirose, 801-88 Kanagaya, Asahi-ku, Yokohama City, Kanagawa, Japan

[21] Appl. No.: 273,284

[22] Filed: Jun. 15, 1981

[30] Foreign Application Priority Data

Mar. 28, 1981 [JP] Japan .................................. 56-44743

[51] Int. Cl.³ .............................................. F23G 5/04
[52] U.S. Cl. .................................. 110/224; 110/221; 110/238
[58] Field of Search ............... 110/238, 224, 221, 346, 110/225

[56] References Cited

U.S. PATENT DOCUMENTS

| | | | |
|---|---|---|---|
| 4,153,411 | 5/1979 | Isheim | 110/238 X |
| 4,232,614 | 11/1980 | Fitch et al. | 110/238 X |
| 4,245,570 | 1/1981 | Williams | 110/238 |
| 4,311,103 | 1/1982 | Hirose | 110/238 |

Primary Examiner—Edward G. Favors
Attorney, Agent, or Firm—Beveridge, DeGrandi & Kline

[57] ABSTRACT

An evaporative concentrator for sewage sludge installed between hopper A and drying furnace C; the one set consisting of heating chamber $B_1$ and evaporation chamber $B_2$ having a construction so that the said one set or several sets are provided in series.

Sewage sludge in the hopper-type bottom of evaporating chamber $B_2$ is pressurized and sent into sewage sludge pass-way 42 in heating chamber $B_1$ by compulsory supply means 48, the sewage sludge is heated in heating chamber $B_1$, the pressurized and heated sewage sludge is led to the upper space of evaporating chamber $B_2$, a part of the water content is vaporized by allowing the said sewage sludge to be sprayed into the said upper space in which the pressure is lowered, the steam is taken out of the system through exhaust gas pipe 46 having condenser 47 at the end, the sewage sludge somewhat cooled by evaporative latent heat removed is recovered in the hopper of evaporating chamber $B_2$ and is recirculated by compulsory supply means, while sewage sludge is fed by another compulsory supply means 1 and a part of the sewage sludge is discharged by distribution means 51.

The several sets of heating chamber $B_1$ and evaporating chamber $B_2$ are connected in series to concentrate sewage sludge by evaporation.

5 Claims, 4 Drawing Figures

EVAPORATING CONCENTRATOR FOR SEWAGE SLUDGE

BACKGROUND OF THE INVENTION

The inventor has developed the sewage sludge incinerator shown in FIG. 1 and further the sewage sludge incinerator provided with sewage sludge heater B given in FIG. 2.

This invention relates to an evaporative concentrator for sewage sludge to be used for a sewage sludge incinerator instead of the sewage sludge heater B illustrated in FIG. 2 in order to improve the sewage sludge incinerators above in performance as follows: This invention relates to an evaporative concentrator for sewage sludge effective when sewage sludge with comparatively low calorific value such as that with water content rate 80 percent or more, or dried sewage sludge with heating value 3500 kcal/kg or less is incinerated.

This invention also relates to an evaporative concentrator for sewage sludge to be used with a sewage sludge incinerator, instead of the sewage sludge heater B given in FIG. 2. Before the description of this invention, the sewage sludge incinerator in FIG. 1 and the sewage sludge incinerator provided with the sewage sludge heater in FIG. 2 are first described.

The sewage sludge incinerator given in FIG. 1 is for sewage sludge with comparatively low water content rate, involves sewage sludge with water content from 60 to 70% therein, and the sewage sludge in hopper A is fed to drying furnace C having a fluidized sand bed by compulsory supply means 1, such as a screw feeder, mounted on the bottom of the said hopper A. A required high pressure gas rate at a temperature as high as 200° to 400° C. is fed from the bottom space of sand layer into drying furnace C through supply pipe 3, the sand layer is fluidized with this gas for drying; the sewage sludge fed is pulverized and dried with the sand fluidized. The yielded product by the said drying furnace C is sucked through discharge pipe 4 having blower 8, is taken out of the said drying furnace from the top thereof, is separated to the solid and the gas by a separation means such as cyclone separators 5 and 5', the solid is contained in hopper 6 thereberneath, and is fed to combustion furnace D by powder supply means 7 thereunder at approximately constant quantity per hour. FIG. 1 shows the two-stage combustion system consisting of incomplete combustion furnace $D_1$ and complete combustion furnace $D_2$. The air for combustion is sent by blower 9, is first preheated through air preheater 10 installed around the periphery of complete combustion furnace $D_2$, then is divided into two suitable quantities, and is supplied to incomplete combustion furnace $D_1$ through branch pipe 11 and to complete combustion furnace $D_2$ through branch pipe 12 respectively. The product of the complete combustion furnace $D_2$ is taken out thereof through exhaust gas pipe 15 having blower 13, is lowered in temperature through heat exchanger E and is discharged after the ash content is separated through filter 14.

The gas separated by separation means 5 flows through circular piping 16, which is the exhaust pipe of blower 8, however, a part of the gas is fed to incomplete combustion furnace $D_1$ by providing branch pipe 21 on the said circular piping 16, and another part of the gas is supplied to complete combustion furnace $D_2$ by further providing branch pipe 22 on the said same piping 16. The residual gas is carried through circular piping 16, is heated by heat exchanger E and is supplied again to drying furnace C having the fluidized sand bed through feed pipe 3 as drying gas.

Gas rate $Q_1$ kg/h sent to the said drying furnace for drying is a rate required for allowing sewage sludge rate M kg/h supplied to the said drying furnace to be heated from room temperature up to about 120° C. and to evaporate the water content thereof, and the said gas rate $Q_1$ kg/h will circulate in circular piping 16. Further, $Q_2$ kg/h, the total gas rate supplied to incomplete and complete combustion furnaces $D_1$ and $D_2$ showed be approximately equal with the gas rate generated from sewage sludge rate M kg/h fed to drying furnace C. The sewage sludge incinerator having the sewage sludge heater in FIG. 2 is a suitable apparatus for incinerating sewage sludge with water content rate about 80 percent or that with dried heating value, 3500 kcal/kg or less. In FIG. 2, sewage heater B is installed between compulsory supply means 1 mounted under the bottom of hopper A containing sewage sludge and drying furnace C having the fluidized sand bed. Sewage sludge is heated near 100° C. by the said heater B and is fed into drying furnace C having the fluidized sand bed; thus, sewage can more easily be dried in the said drying furnace C than before. The dried sewage sludge product yielded in the said drying furnace C is divided into the solid and the gas by separation means 5, the solid is contained in hopper 6 below, and is fed to incomplete combustion furnace $D_1$ by powder supply means 7 at approximately constant rate per hour. The gas divided by separation means 5 is pressurized by blower 8, passes the circular piping 16, is heated by heat exchanger E, and then required rate $Q'_1$ kg/h thereof is supplied to drying furnace C as drying gas. The remaining gas rate $Q'_2$ kg/h is fed to the said sewage sludge heater B through supply pipe 17 as heating gas. The gas lowered in temperature as a result of the heat exchange in the said sewage sludge heater B is taken out through pipe 18, the drain is removed by drain separation means 19. The removed drain is taken out of the system, and the gas from which the drain is removed is fed to incomplete combustion furnace $D_1$ through supply pipe 20.

As such, the sewage sludge incinerator having sewage sludge heater B as given in FIG. 2 is not only to be able to dry sewage sludge easily, because the sewage sludge heated near 100° C. in temperature, consequently, sewage sludge extremely lowered in viscosity is fed to drying furnace C, but also gas allowed to reduce the water content is fed to combustion furnaces $D_1$ and $D_2$; thus, the primary incomplete and the secondary complete combustions can smoothly be performed.

DETAILED EXPLANATION OF THE INVENTION

Figure 1:
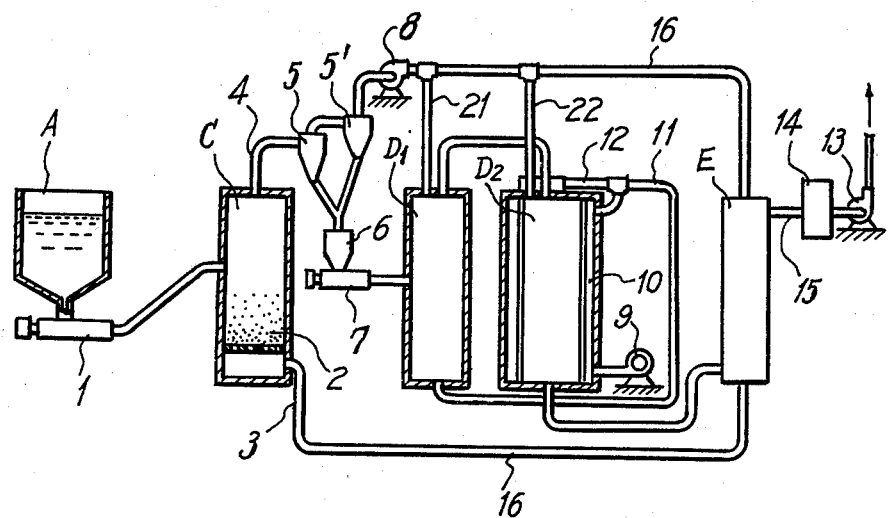
FIG. 1 is the side view for explanation of the sewage sludge incinerator that has been developed by the inventor before.
Figure 2:
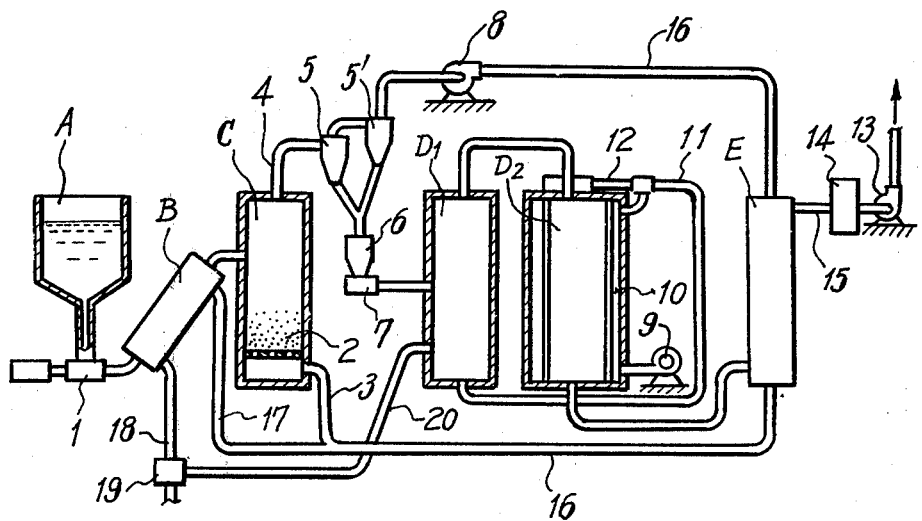
FIG. 2 is the side view for explanation of the sewage sludge incinerator provided with the sewage sludge heater that has also been developed by the inventor before.

The sewage sludge evaporative concentrator of this invention is that to be used instead of sewage sludge heater B as shown in FIG. 2.

This evaporative concentrator has a construction that the one set through several sets consisting of heating chamber $B_1$ and evaporating chamber $B_2$ are used in series.

Originally, sewage sludge is viscous and can not make self-circulation, however, in this evaporative concentrator, sewage sludge is forcibly fed by pressurizing sewage sludge into heating chamber $B_1$ by a compulsory supply means such as a screw feeder or a piston pump. Sewage sludge is heated in the said heating chamber under pressurized conditions, is sent up to the top space of the next evaporating chamber $B_2$ while pressurized and is sprayed into the said top space by an atomization means. A gas discharge pipe is provided for the said top space and the one end of the said gas discharge pipe is connected with a condenser directly or indirectly. Therefore, the top space of the said evaporating chamber can be adjusted to a desired low pressure. When the sewage sludge, pressurized and heated, is led to the top space of the said evaporating chamber and is sprayed into the low pressure atmosphere, a part of the water content is evaporated and this steam is taken out through the said gas discharge pipe. The sewage sludge from which the latent heat for evaporation is removed, is somewhat cooled, is accumulated in the hopper of the said evaporating chamber, most of the sewage sludge is pressurized and sent again to heating chamber $B_1$ by mounting a compulsory supply means on the bottom of the said hopper, and is heated in the said heating chamber $B_1$. A part of the sewage sludge accumulated in the hopper of the said evaporating chamber $B_2$ is fed to second heating chamber $B_3$ of the next set or drying chamber C having a fluidized sand bed of the next process.

For this evaporative concentrator, sewage sludge is, as described above, pressurized and sent to heating chamber $B_1$ is heated therein under the pressurized conditions, then is sprayed into low pressure atmosphere in the top space of evaporating chamber $B_2$, a part of the water content is evaporated, the remainder of the sewage sludge from which the latent heat for evaporation is removed is somewhat cooled, is accumulated in the hopper of the bottom of the said evaporating chamber $B_2$, most of the sewage sludge is again pressurized and sent to heating chamber $B_1$ by mounting a compulsory supply means on the lower section of the said hopper and is heated in the said heating chamber $B_1$. A part of the sewage sludge accumulated in the hopper of the said evaporating chamber $B_2$ is fed to second heating chamber of the next set or drying chamber C having the fluidized sand bed of the next process. Thus, some portion of the water content of the sewage sludge is evaporated while the sewage sludge is circulated between heating chamber $B_1$ and evaporating chamber $B_2$, the sewage sludge is concentrated by taking the steam out of the system, and a part thereof is fed to the next process.

This evaporative concentrator may provide one set of heating chamber $B_1$ and evaporating chamber $B_2$ or several sets of heating chamber $B_1$ and evaporating chamber $B_2$ described above and can use the evaporated steam obtained by a previous set as heating gas in the next set. With this, the thermal efficiency is improved, and as a result, the evaporative concentrator can further be made suitable for sewage sludge with high water content rate. Namely, steam taken out through a gas discharge pipe provided for first evaporating chamber $B_2$ is not immediately led to a condenser, but is used as heating gas for heating chamber $B_3$ of the next set.

As such, this evaporative concentrator can effectively utilize steam latent heat by installing the heating and the evaporating chambers not only one set but also several sets, can feed sewage sludge originally including high water content rate of 80 percent or more, and can reduce water content rate down to about 67 percent. And can feed the concentrated sewage sludge to drying furnace C having a fluidized sand bed of the next process and can perform the drying in drying furnace C and the burning in combustion furnace D smoothly.

The sewage sludge evaporative concentrator of this invention can feed sewage sludge to drying furnace C having a fluidized sand bed in the next process after allowing such high water content rate one as 80 percent to reduce water content rate thereof down to 67 percent as compared with any conventional one. For example, sewage sludge heater B as shown in FIG. 2, simply heats sewage sludge for fluidization to be dried easily and feeds it to drying furnace C having a fluidized sand bed in the next process.

Namely, sewage sludge involving water content rate of 80 percent has the solid content of 20/100 M kg/h and the water content of 80/100 M kg/h, where M kg/h is the treating rate. This evaporative concentrator allows to evaporate about a half rate, 40/100 M kg/h from water content rate as large as 80/100 M kg/h and finally the compositions of solid content rate, 20/100 kg/h and water content rate, 40/100 M kg/h, i.e., water content rate of 67 percent is obtained, and this is fed to drying furnace C. As a result, gas quantity $Q_1'$ supplied to the said drying furnace as drying gas is somewhat reduced from conventional gas quantity $Q_1$. The gas rate generated in the said drying furnace is also reduced to near 40/100 M kg/h, not conventional 80/100 M kg/h, thus, gas rate $Q_2'$/h supplied to this evaporative concentrator as heating gas is also reduced to about 40/100 M kg/h, about one half of $Q_2 \approx 80/100$ M kg/h, where $Q_2$ is gas rate conventionally supplied to sewage sludge heater B given in FIG. 2.

Figure 3:
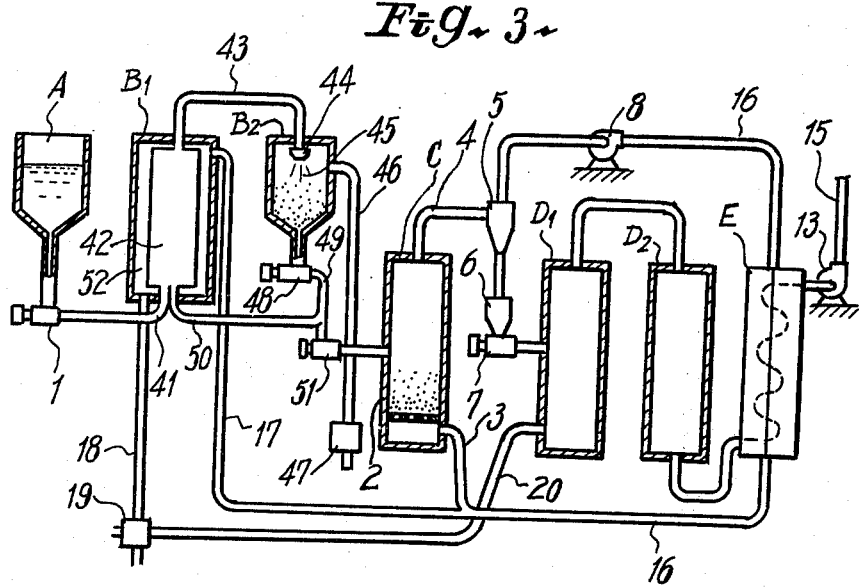
FIG. 3 is the side cross sectional view for explanation of the sewage sludge evaporative concentrator of this invention showing in the relationship that the heating chamber and the evaporating chamber compose the one set.
Figure 4:
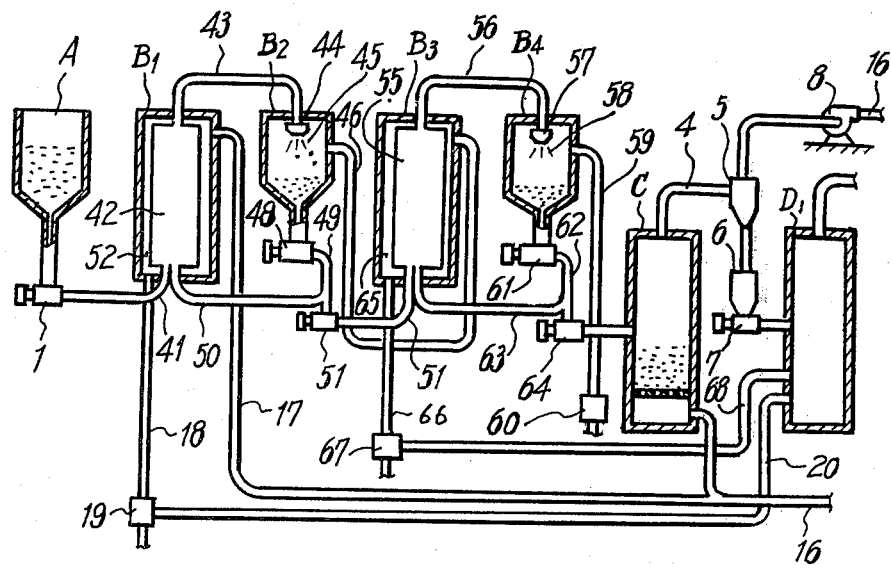
FIG. 4 is the side cross sectional view for explanation of the sewage sludge evaporative concentrator of this invention, including the two sets of the heating chamber and evaporating chamber in series.

The sewage sludge evaporative concentrator of this invention is herebeneath described according to FIGS. 3 and 4.

In FIG. 3, first, sewage sludge involving water content rate as large as 80 percent is contained in hopper A, compulsory supply means 1 such as a screw feeder is mounted on the bottom of the said hopper A, the sewage sludge flowing through discharge pipe 41 thereof is fed to heating chamber $B_1$ of this evaporative concentrator from the bottom thereof. Sewage sludge passway 42 is provided for the said heating chamber $B_1$. Because the said discharge pipe 41 is connected with the said sewage sludge pass-way 42, the sewage sludge is heated by heat transfer through the surrounding wall from high pressure and high temperature gas, while the sewage sludge is forcibly elevated through this sewage sludge pass-way 42, is expelled through discharge pipe 43 of the said heating chamber $B_1$, is led up to the top space in the next evaporating chamber $B_2$ and is sprayed from nozzles 44 mounted on that pipe end into the top space in the said evaporating chamber $B_2$. Gas discharge pipe 46 is provided for top space 45 of the said evaporating chamber $B_2$, and condenser 47 is connected with the said gas discharge pipe. Therefore, a pressure in top space 45 of the said evaporating chamber can be made to any desired one by adjusting the ability of the said condenser. A part of the water content contained in the sewage sludge is evaporated when the sewage sludge is sprayed energetically from the said nozzles 44 into the upper space 45 of the evaporating chamber, and the evaporated steam is expelled out of the system by condenser 47 connected with discharge pipe 46. Compulsory supply means 48 such as a screw feeder is mounted on the hopper-type bottom of the said evaporating chamber, most of the sewage sludge expelled from discharge pipe 49 of the said compulsory supply means 48 is again led to the bottom of heating chamber $B_1$ through branch pipe 50, which is laid parallel with discharge pipe 41 of the said compulsory supply means 1; thus, the sewage sludge fed from discharge pipe 41 and the sewage sludge fed from the said branch pipe 50 are gathered together and are raised through sewage sludge passage 42 in heating chamber $B_1$. Further, distribution means 51 is provided for the said discharge pipe 49 and is connected with drying furnace C, and a part of the sewage sludge is fed to drying furnace C having the fluidized sand bed by the said distribution means 51. This sewage sludge has been allowed to circulate through heating chamber $B_1$ and evaporating chamber $B_2$ again and again and is dehydrated and concentrated because the water content involved in the sewage sludge is evaporated and removed. The end of supply pipe 17 for high pressure and high temperature heating gas is connected with heating gas passage 52 in heating chamber $B_1$, the said heating gas passage 52 is separated from sewage sludge passage 42 previously described by heat-conductive metal wall, and the heating gas is mostly fed countercurrently.

Gas pressure $P_2$ in the said heating gas passage 52 is of course is lower than pressure $P_1$ in sewage sludge passage 42. Therefore, no water content of the sewage sludge is evaporated in sewage sludge pass-way of the said heating chamber $B_1$, and the steam in the heating gas is condensed to drain at condensing temperature $T_2$ corresponding to pressure $P_2$ with the heat removed in the heating chamber $B_1$. The sewage sludge is kept at pressure $P_1$, is fed to evaporating chamber $B_2$ after being heated up to about temperature $T_2$, a part of the water content involved in the sewage sludge is evaporated when the sewage sludge is sprayed in the top space 45 of the said evaporating chamber $B_2$, since pressure $P_3$ in the top space 45 is lower than $P_2$, the remaining sewage sludge is somewhat lowered in temperature because of the evaporation heat removed, is accumulated on the hopper-type bottom of the said evaporating chamber $B_2$ and most of the sewage sludge is returned again to heating chamber $B_1$ and is heated. The evaporated steam that is allowed to generate in the said top space 45 is carried away out of the system through gas discharge pipe 46 with condenser 47, the sewage sludge is concentrated, and a part thereof is fed to drying furnace C, the next process.

The gas after the drain is carried away out of the system by providing drain separation means 19 for discharge pipe 18 which is connected with heating gas passage 52 of the said heating chamber $B_1$ and transfers gas excluding drain is fed to incomplete combustion furnace $D_1$ through supply pipe 20.

The evaporative concentrator for sewage sludge, shown in FIG. 3 and has previously described, has a construction providing only the one set of heating chamber $B_1$ and evaporating chamber $B_2$, whereas, FIG. 4 gives the evaporative concentrator for sewage sludge providing the two sets of the heating and evaporating chambers, i.e., heating chamber $B_1$, evaporating chamber $B_2$, second heating chamber $B_3$ and second evaporating chamber $B_4$.

The evaporative concentrator of this invention is designed to have such a construction in FIG. 4 so that compulsory supply means 1 is mounted on the bottom of hopper A to contain sewage sludge, discharge pipe 41 of the said supply means is led up to heating chamber $B_1$, sewage sludge pass-way 42 is laid and connected with the said discharge pipe 41 for the said heating chamber, discharge pipe 43 of the said sewage sludge passage 42 is led up to the top space 45 in evaporating chamber $B_2$, nozzles 44 is fitted to the said pipe 43 at the end, and gas exhaust pipe 46 is laid from top space of the said evaporating chamber $B_2$. Further, compulsory supply means 48 is mounted on the hopper-type bottom of the said evaporating chamber $B_2$, transfer pipe 50 to carry most of the sewage sludge expelled from discharge pipe 49 of the said compulsory supply means 48 is laid and is connected with sewage sludge pass-way 42 of heating chamber $B_1$, in addition, distribution means 51 is provided for and the end is connected with sewage sludge pass-way 55 of second heating chamber $B_3$, exhaust pipe 56 of the said sewage sludge pass-way 55 is led up to the top space 58 in second evaporating chamber $B_4$, nozzles 57 is mounted on the said pipe end. Exhaust gas pipe 59 is laid from top space 58 in the said second evaporating chamber $B_4$, compulsory supply means 61 is mounted on the hopper-type bottom of the said second evaporating chamber $B_4$, transfer pipe 63 to carry most of the sewage sludge expelled from discharge pipe 62 of the said compulsory supply means 61 is laid and connected with sewage sludge pass-way 55 of second heating chamber $B_3$, distribution means 64 is provided for discharge pipe 62 of second evaporating chamber $B_4$ and is connected with drying furnace C having the fluidized sand bed. Supply pipe 17 for heating gas is connected with heating gas passage 52 of heating chamber $B_1$, drain separation means 19 is provided for discharge pipe 18 of the said heating gas passage 52, supply pipe 20 for the gas from which the drain has been separated is connected with incomplete combustion furnace $D_1$, exhaust gas pipe 46 from top space 45 in evaporating chamber $B_2$ previously described is connected with heating gas passage 65 of second heating chamber $B_3$, drain separation means 67 is provided for discharge pipe 66 of the said heating gas passage 65, and supply pipe 68 for the gas from which the drain has been removed is connected with incomplete combustion furnace $D_1$.

Further, pressure $P_1$ in sewage sludge pass-way 41 of heating chamber $B_1$ is designed so as to be fairly higher than pressure $P_2$ in heating gas passage 52 of heating chamber $B_1$, exhaust gas pipe 46 from top space 45 in evaporating chamber $B_2$ is connected with heating gas passage of second heating chamber $B_3$, pressure $P_3$ in the said top space 45 is designed so as to be lower than pressure $P_2$ in the heating gas passage 52, pressure $P_4$ in sewage sludge pass-way of second heating chamber $B_3$ is designed so as to be higher than pressure $P_5 (=P_2)$ in heating gas passage 65 of second heating chamber $B_3$, and pressure $P_6$ at top space 58 in the said second evaporating chamber $B_4$ is adjusted so that pressure $P_6$ is far lower than pressure $P_5$ at heating gas passage of second heating chamber $B_3$ by providing condenser 60 for exhaust gas pipe 59 from top space 58 in second evaporating chamber $B_4$.

The evaporating concentrator shown in FIG. 4 is constructed as described above and can effectively utilize latent heat of steam and can smoothly reduce the water content rate of sewage sludge widely, for example, about 67 percent; therefore, can feed sewage sludge with low water content rate, for example, about 67 percent to drying furnace C having a fluidized sand bed in the next process, as a result, can allow smooth drying at drying furnace C and further, when the dried yield product is sent to combustion furnace D for burning, combustion furnace can allows to burn the product smoothly, even if original sludge should include water content rate as large as 80 percent or more under the first supply conditions or even if the solid dried from sewage sludge should have heating value as low as 3500 kcal/kg or less.

FIG. 4 gives the evaporating concentrator for sewage sludge according to this invention and shows an embodiment having the two sets of the heating and the evaporating chambers, namely, heating chamber $B_1$, evaporating chamber $B_2$, second heating chamber $B_3$ and second evaporating chamber $B_4$. However, it is, of course, possible to install the three or more sets of the heating and the evaporating chambers and to burn sewage sludge with water content rate higher than 80 percent smoothly.

What I claim is:

1. An evaporative concentrator for sewage sludge comprising a heating chamber and an evaporating chamber between a feed hopper and a drying furnace having a fluidized sand bed, the concentrator further comprising
    a first compulsory supply means for delivery of sewage sludge from said hopper through a first discharge pipe to said heating chamber,
    a sewage sludge pass-way provided for said heating chamber connected with said first discharge pipe,
    a second discharge pipe extending from said sewage sludge pass-way to a top space in said evaporating chamber with a nozzle fitted to the end of said second discharge pipe,
    an exhaust gas pipe extending from said top space in said evaporating chamber to a condenser,
    a second compulsory supply means mounted on a hopper-type bottom of said evaporating chamber, a third discharge pipe from said second compulsory supply means to a transfer pipe which is adapted to carry most of the sewage sludge to be expelled from said third discharge pipe to said sewage sludge pass-way,
    a distribution means connecting said third discharge pipe with said drying furnace having a fluidized sand bed,
    a first supply pipe for heating gas connected with a heating gas passage in said heating chamber,
    a fourth discharge pipe from said heating gas passage, extending to a drain separation means,
    a second supply pipe extending from said drain separation means to a combustion furnace, whereby the pressure $P_1$ in said sewage sludge pass-way is higher than the pressure $P_2$ in said heating gas passage, and the pressure $P_3$ in said top space of said evaporating chamber is lower than the pressure $P_2$ in said heating gas passage.

2. An evaporative concentrator for sewage sludge comprising upstream and downstream sets of heating and evaporating chambers between a feed hopper and a drying furnace having a fluidized bed wherein,
    a first discharge pipe of a first compulsory supply means is mounted on the bottom of said feed hopper and extends to said upstream heating chamber,
    a first sewage sludge pass-way is provided for said upstream heating chamber connected with said first discharge pipe,
    a second discharge pipe extends from said sewage sludge pass-way to a first top space in said upstream evaporating chamber with a nozzle fitted to the end of said second discharge pipe,
    a first exhaust gas pipe is provided for said first top space in said upstream evaporating chamber,
    a second compulsory supply means is mounted on a hopper-type bottom of said upstream evaporating chamber,
    a third discharge pipe extends from said second compulsory supply means to a first transfer pipe to carry most of the sewage sludge from said third discharge pipe to said first sewage sludge pass-way in said upstream heating chamber,
    a first distribution means is connected between said third discharge pipe and a second sewage sludge pass-way in said downstream heating chamber,
    a fourth discharge pipe extends from said second sewage sludge pass-way to a second top space in said downstream evaporating chamber with a second nozzle fitted to said fourth discharge pipe,
    a second exhaust gas pipe extends from said second top space in said downstream evaporating chamber,
    a third compulsory supply means is mounted on a hopper-type bottom of said downstream evaporating chamber,
    a fifth discharge pipe extends from said third compulsory supply means to a second transfer pipe to carry most of the sewage sludge from said fifth discharge pipe to said second sewage sludge pass-way in said downstream heating chamber,
    a second distribution means is connected between said fifth discharge pipe and said drying furnace having a fluidized sand bed,
    a first supply pipe for heating gas is connected with a first heating gas passage in said upstream heating chamber,
    a sixth discharge pipe extends from said first heating gas passage and is provided with a first drain separation means,
    a second supply pipe is provided to feed gas from said first drain separation means to a combustion furnace,
    said first exhaust gas pipe from said first top space of said upstream evaporating chamber is connected with a second heating gas passage in said downstream heating chamber,
    a seventh discharge pipe extends from said second heating gas passage and is provided with a second drain separation means, a third supply pipe is provided to carry gas from said second drain separation means to said combustion furnace, said first exhaust gas pipe from said first top space in said upstream evaporating chamber is connected with a second heating gas passage in said downstream heating chamber, and a condenser is provided for said second exhaust gas pipe from said second top space of said downstream heating chamber, whereby pressure $P_1$ in said first sewage sludge pass-way of said upstream heating chamber is higher than pressure $P_2$ of said first heating gas passage, pressure $P_3$ in said first top space is lower than pressure $P_2$ of said first heating gas passage, pressure $P_4$ in said second sewage sludge pass-way of said downstream heating chamber is higher than pressure $P_5$ in said second heating gas passage of said downstream heating chamber, said pressure $P_5$ is equal to said pressure $P_2$, and pressure $P_6$ in said second top space of said downstream evaporating chamber is lower than pressure $P_5$ in said second heating gas passage.

3. A concentrator for removing water from sewage in a sewage sludge incineration system having an infeed hopper, a drying furnace with a fluidized sand bed and a combustion furnace generating hot gases comprising a heat exchange means for heating sewage sludge including a sewage sludge pass-way and a heating gas passage, means for conveying sewage sludge from said infeed hopper to said sewage sludge pass-way, means for providing hot gases generated by said combustion furnace to said heating gas passage of said heat exchange means, a discharge means for discharging said gases from said heating gas passage after transferrng heat to sewage sludge in said sewage sludge pass-way and for supplying said gases to said combustion furnace, means for evaporating water from said sewage sludge as heated by said heat exchange means including a chamber at a lower static pressure than said sewage sludge pass-way, means for transporting said sewage sludge from said sewage sludge pass-way to said chamber, a nozzle for spraying said transported sewage sludge into said chamber, an exhaust gas pipe for conveying gases from said chamber to a condenser, and an outlet from said chamber for sewage sludge solids and residual water, and a means for transferring most of said sewage sludge solids and residual water to said sewage sludge pass-way and for conveying the remainder of said sewage sludge solids and residual water to said drying furnace with a fluidized sand bed.

4. A concentrator as claimed in claim 3 wherein said heating gas passage of said heat exchange means substantially surrounds said sewage sludge pass-way.

5. A concentrator for removing water from sewage sludge in a sewage sludge incineration system having an infeed hopper, a drying furnace with a fluidized sand bed and a combustion furnace generating hot gases comprising a first heat exchange means for heating sewage sludge including a first sewage sludge pass-way and a first heating gas passage, means for conveying sewage sludge from said infeed hopper to said sewage sludge pass-way, means for providing hot gases generated by said combustion furnace to said first heating gas passage of said first heat exchange means, a discharge means for discharging gases from said first heating gas passage after transferring heat to sewage sludge in said first sewage sludge pass-way and for supplying said gases to said combustion furnace, a first means for evaporating water from said sewage sludge as heated by said first heat exchange means including a first chamber at a lower static pressure than said first sewage sludge pass-way, a first means for transporting sewage sludge from said first sewage sludge pass-way to said first chamber, a first nozzle for spraying said transported sewage sludge into said first chamber, a first exhaust pipe for conveying gases from said first chamber and an outlet from said first chamber for sewage sludge solids and residual water, a second heat exchange means having a second sewage sludge pass-way and a second heating gas passage that receives gases conveyed by said first exhaust pipe, a first means for transferring most of said sewage sludge solids and residual water from said first chamber to said first sewage sludge pass-way and for conveying the remainder of said sewage sludge solids and residual water from said first chamber to said second sewage sludge pass-way, a second means for evaporating water from sewage sludge as heated by said second heat exchange means including a second chamber at a lower static pressure than said second sewage sludge pass-way, means for transporting sewage sludge from said second sewage sludge pass-way to said second chamber, a second nozzle for spraying said transported sewage sludge into said second chamber, a second exhaust gas pipe for conveying gases from said second chamber to a condenser, and a second outlet from said second chamber for sewage sludge solids and still residual water, a second means for transferring most of said sewage sludge solids and still residual water from said second chamber to said second sewage sludge pass-way and for conveying left over sewage sludge solids and water to said drying furnace with a fluidized sand bed.

* * * * *